Oct. 12, 1926.
J. B. WOLFE
1,602,735
TRACTION DEVICE FOR AUTOMOBILES
Filed June 17, 1925    2 Sheets-Sheet 1
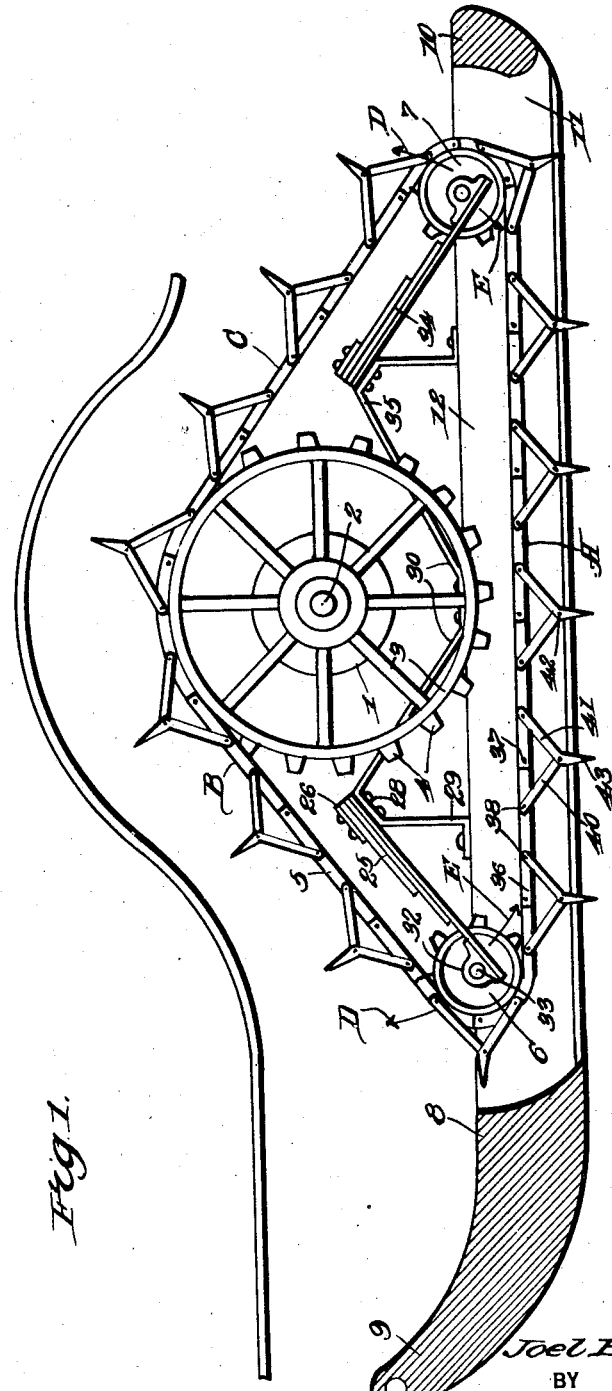
INVENTOR
Joel B. Wolfe
BY
Carl H. Crawford
ATTORNEY Oct. 12, 1926. 1,602,735
J. B. WOLFE
TRACTION DEVICE FOR AUTOMOBILES
Filed June 17, 1925 2 Sheets-Sheet 2
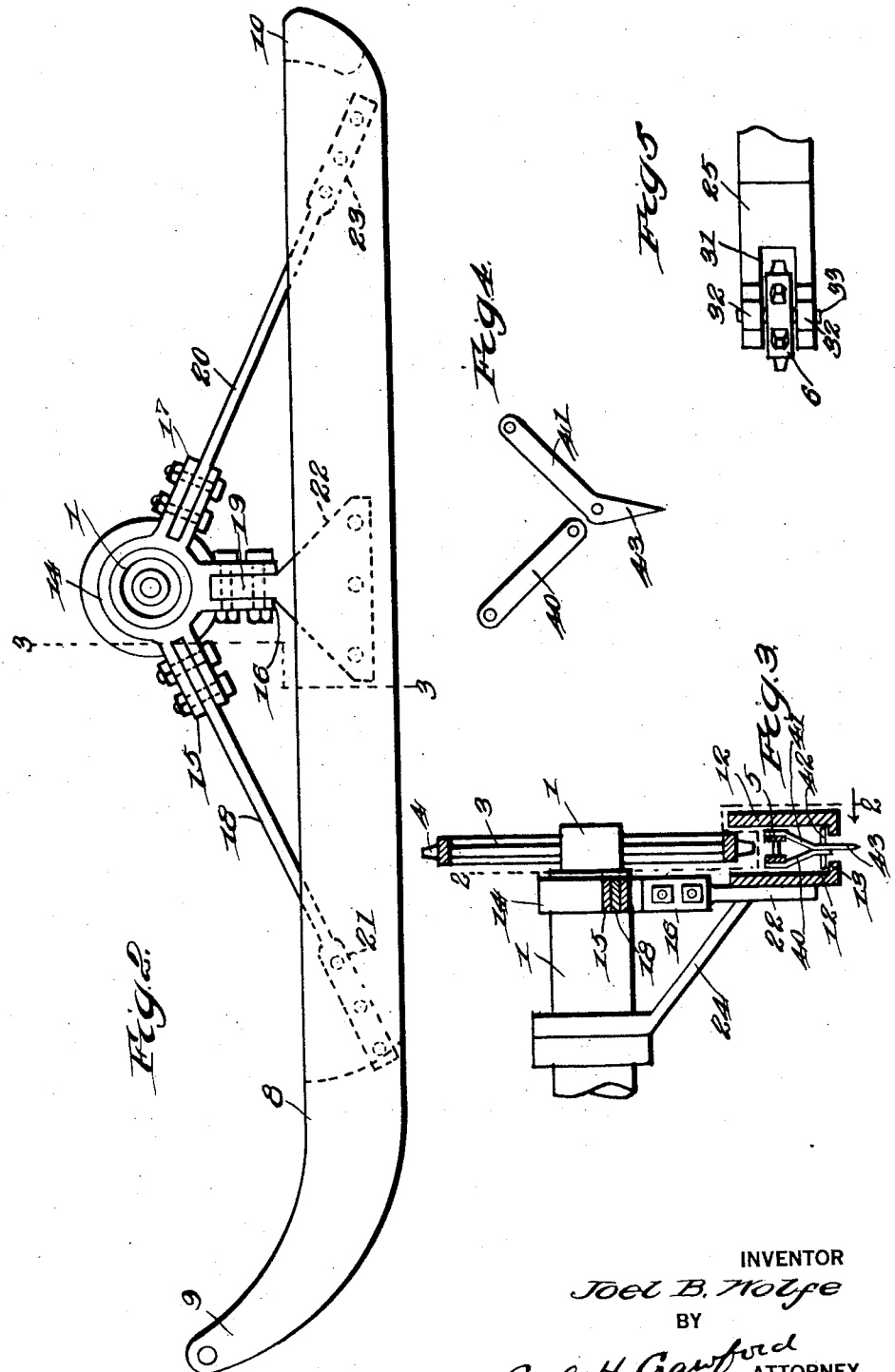
INVENTOR
Joel B. Wolfe
BY
Carl H. Crawford ATTORNEY Patented Oct. 12, 1926.

1,602,735

UNITED STATES PATENT OFFICE.

JOEL B. WOLFE, OF FRUITLAND, WASHINGTON.

TRACTION DEVICE FOR AUTOMOBILES.

Application filed June 17, 1925. Serial No. 37,738.

This invention relates to improvements in driving runners for motor vehicles.

In this class of structures, it is usual to employ a driving wheel on the vehicle and a tractive chain trained about the driving wheel and about sprockets, the latter disposing a length of the chain in tractive relation to the road, relative to the runner.

This invention has to do with a novel means of mounting the spacing sprockets so that the tractive chain, responsive to road and driving stresses, can take various positions automatically with respect to the runner and the road.

It is a feature of this invention to yieldingly mount the spacing sprockets in such a manner that when the road is icy and hard, the sprockets will move away from each other and thereby elevate the tractive lap or bight of the chain with respect to the road and runner.

It is also a feature of the invention that when the chain negotiates or rides over an obstruction projecting from the road surface, thereby acting to belly the chain, the sprockets can shift toward each other and compensate for such disposition of the chain, always retaining the latter taut in any event.

One of the primary features of the invention is to provide means whereby the spacing sprockets can shift in irregular paths, responsive to tractive and obstructive thrusts imposed upon the chain.

My invention has many other features and advantages which will be more fully described in connection with the accompanying drawings and which will be more particularly pointed out in and by the appended claims.

In the drawings:—

Fig. 1, is a view in side elevation, partly in section, showing a motor driven vehicle equipped with one form of the device of my invention.

Fig. 2, is a view of the runner showing the manner of connecting the same with the axle housing, taken on line 2—2 of Fig. 3.

Fig. 3, is a sectional view on line 3—3 of Fig. 2.

Fig. 4, is a detail view of one tractive spike and its link member and a link bar for connecting the spike member to the chain.

Fig. 5, is a plan view showing the manner of journalling the spacing sprocket to the end of the spring therefor.

Like characters of reference designate similar parts throughout the different figures of the drawings.

The rear axle housing is generally shown at 1, one axle shaft being indicated at 2. The usual rear wheel, in accordance with my invention, is preferably removed and a driving wheel 3, is suitably fixed on the axle shaft 2. Thus, the driving wheel 3, will have imparted thereto the drive from the engine in the usual way, which need not be described in detail.

Driving wheel 3, is herein shown as a sprocket wheel having sprocket teeth 4, of any suitable form over which a traction belt or chain 5, is trained. Sprockets 6 and 7, are arranged, in this embodiment, so that the chain 5 is disposed in triangular form with the base A in tractive relation to the road, and the sides B and C in converging inclines toward the driving wheel 3. The sprockets 6 and 7 are idlers and the chain 5 is trained over these sprockets, as shown.

A runner is shown at 8, and the same may have an upwardly curved forward end 9, and a rearward end 10, as shown. For the purpose of accommodating the tractive lap A, of the chain 5, and to permit of the latter being disposed in tractive relation to the road, the runner 9 is open, or slotted, as shown at 11, the sides 12 being in any manner suitably stiffened or reinforced, which is not material to this invention. It is a feature of the invention to provide the slitted portion 11 with flanges 13, to prevent the chain 5, as regards its tractive lap, from completely descending downwardly out of range of the runner. In accordance with this invention, the rear runners 8, of which only one is shown, serve to support the vehicle, in combination with suitable front runners, not shown, and I will next briefly describe the means for supporting the rear axle housing on the runner.

A suitable collar 14, swivelled on housing 1, is provided with a plurality of sets of jaws 15, 16 and 17, in which brace struts 18, 19 and 20, respectively, are bolted at their upper ends. The lower ends of these braces are secured to the inside face of runner 8, as indicated at 21, 22 and 23. One or more inclined braces, as indicated at 24, may supplement the foregoing braces. However, I am merely concerned with a type of structure in which the vehicle is supported on the runner, irrespective of the specific means for the performance of this function.

I will next describe the novel manner and means for mounting the idle spacing sprockets 6 and 7.

As both sprockets operate in the same manner and as both are mounted by the same kind of means, only one need be described in detail. I have shown a laminated leaf spring 25 tapering from a relatively enlarged butt end 26 to a reduced end 27. This spring, in the specific form shown, is disposed substantially parallel with side B, of the triangularly disposed chain. Its upper butt end 26, is shown anchored to a bracket 28 having legs 29 and 30, which are secured to the runner 8. The lower or smaller end 27, of said spring, is bifurcated at 31, and journal bearings 32, are suitably secured thereto. A shaft 33, journalled in said bearings, supports sprocket 6, about which chain 5 is trained. I have indicated the remaining spring by reference 34, as being supported on bracket 35, to facilitate a subsequent description of operation of the two springs. While the two springs are in all respects identical, it will be noted that they diverge in opposite directions from the driving wheel 3.

I will next briefly describe the chain 5, and the tractive spikes with which the chain is equipped.

The chain 5, may be of any approved link form, the links 36 being united by link pins 37 and 38, one pin 37 being disposed between each pair of pins 38. The pins themselves, or roller sleeves 39 thereon, may coact with the teeth of sprockets 6 and 7 and with the teeth of wheel 3. As wheel 3, is the mechanical driving agency, the wheels 6 and 7 may in some instances be without teeth, although this is not important. The tractive devices, as shown, each consist of a tension link 40 having its upper end pivoted to one of the pins 38. A compression spike link 41, has its upper end pivoted to one of the pins 38, of the next following pair, to that with which the companion tension link 40, is pivoted, leaving a pivot 27, between each of said spike devices. The spike link 41 is pivoted at 42, to its companion tension link 40, and said spike link has a spike-like extension 43, which extends downwardly through the runner for tractive engagement with the road.

Now it is an important feature of my invention that the lap or bight A, is unrestrained between the sprockets 6 and 7 and hence that part of the chain 5 between these sprockets can take any position responsive to tractive thrusts imposed thereon. If the chain encounters an upwardly extending obstruction, the chain can bow up toward wheel 3 at any point along the length of bight A. As far as downward movement of the chain is concerned, it is limited by engagement of the ends of pins 37 and 38, with flanges 13. However, the position of sprockets 6 and 7, unless thrust into a very abnormal location, would prevent the chain from actually descending below the runner.

I will next describe the operation of my improved driving runner.

By this novel location of the springs 25 and 34, and by reason of the fact that the bar like springs are rigid in the direction of their length and only flexible transversely of their length, it will be clear that I provide a substantially rigid structural means for supporting the sprockets 6 and 7 in a normal position to retain the requisite tautness of the chain. Of course, it will be understood that all chains, especially, a relatively slow moving tractive chain, will run more freely and efficiently if slightly loose, and hence it is not my intention to run the chain extremely tight.

In relatively soft snow, the spikes 43 would project downwardly substantially as shown in Fig. 1. If the vehicle encountered an icy hard road surface which the spikes could not enter, the springs 25 and 34 would flex, permitting the sprockets 6 and 7 to shift away from each other as indicated by the arrows D. This would result in elevating the bight A although the chain would be held to the same tension. Suppose the bight A, encountered a slight road elevation acting to belly-up the chain between sprockets 6 and 7, then the springs 25 and 34 would flex to permit the sprockets to approach each other, as indicated by arrows E. Therefore, it will be seen that the springs automatically compensate for not only the different degrees of hardness of the road, but also for the irregularities thereof. It will now be clear that it is important that the tractive bight A, is wholly unrestrained against upward flexure between sprockets 6 and 7.

When the chain is under tractive stress, the springs 25 and 34 will yield while the spike devices assume the position shown in Fig. 6. This "kinking" of the tractive lap A, under load, tends to shorten the chain, and by reason of the fact that the chain can be thus "kinked" it will be clear that the propulsion of the vehicle will not be accompanied by jerks, and will thus be of a yielding and smooth nature.

It will now be clear that I have provided spring mechanism which not only floatingly holds the sprockets in position but which permits of individual movement of one sprocket with respect to the other, responsive to "kinking" or other stresses to which the chain is subjected.

I claim:—

1. The combination in a motor vehicle with a driving wheel, of a runner supporting the vehicle, a tractive chain trained about said wheel, sprockets about which said chain is trained and said sprockets being so arranged with respect to said wheel to dispose said chain in a substantially triangular form with the base of the triangle in tractive relation to the road, and elongated leaf springs disposed in substantially parallel relation with the inclined sides of the chain and being anchored at their upper ends, said sprockets being journalled in the lower end of said springs.

2. The combination in a motor vehicle with a driving wheel, of a runner supporting the vehicle, a tractive chain trained about said wheel, sprockets about which said chain is trained and said sprockets being so arranged with respect to said wheel to dispose said chain in triangular formation with the base of the triangle in tractive relation to the road, and normally straight laminated leaf springs disposed in substantially parallel relation with the inclined sides of said chain, the larger butt ends of said springs being uppermost and being anchored to said runner, said sprockets being journalled in the lower smaller ends of said springs.

3. The combination in a motor vehicle with a driving wheel, of a runner supporting said vehicle, a tractive chain trained about said driving wheel, sprockets about which the end bights of said chain are trained, and bar-like springs each having one end thereof in holding relation to one sprocket and the remaining end in anchored relation to the said runner, thereby individually and floatingly supporting said sprockets.

4. The combination in a motor vehicle with a driving wheel, of a runner supporting said vehicle, a tractive chain trained about said driving wheel, sprockets about which the remaining bights of said chain are trained, and bar-like springs each having one end thereof in holding relation to one sprocket and the remaining end in anchored relation to said runner, said springs being disposed in a manner to normally take their stress primarily in the direction of their length in holding said sprockets in spaced relation and being adapted to buckle to permit said sprockets to approach each other.

In testimony that I claim the foregoing as my own, I hereby affix my signature.

JOEL B. WOLFE.